(12) United States Patent
Kim (10) Patent No.: US 7,869,486 B2
(45) Date of Patent: Jan. 11, 2011

(54) TRACKING APPARATUS AND METHOD FOR A MOBILE COMMUNICATION SYSTEM

(75) Inventor: Hyun-Cheol Kim, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1546 days.

(21) Appl. No.: 11/206,189

(22) Filed: Aug. 18, 2005

(65) Prior Publication Data

US 2006/0039452 A1 Feb. 23, 2006

(30) Foreign Application Priority Data

Aug. 18, 2004 (KR) .................... 10-2004-0065226

(51) Int. Cl.
*H04B 1/707* (2006.01)

(52) U.S. Cl. .................... 375/148; 375/346

(58) Field of Classification Search ........ 375/147–150, 375/152, 140, 316, 346
See application file for complete search history.

(56) References Cited

U.S. PATENT DOCUMENTS

| | | | | |
|---|---|---|---|---|
| 4,894,842 A * | 1/1990 | Broekhoven et al. | ........ | 375/150 |
| 5,422,909 A * | 6/1995 | Love et al. | .................. | 375/147 |
| 5,659,573 A * | 8/1997 | Bruckert et al. | ............. | 375/142 |
| 5,953,367 A * | 9/1999 | Zhodzicshsky et al. | ..... | 375/147 |
| 6,067,292 A * | 5/2000 | Huang et al. | ................. | 370/342 |
| 6,201,828 B1 * | 3/2001 | El-Tarhuni et al. | .......... | 375/150 |
| 6,459,883 B2 * | 10/2002 | Subramanian et al. | ... | 455/67.11 |
| 6,549,559 B2 * | 4/2003 | Kamgar et al. | .............. | 375/134 |
| 6,603,801 B1 | 8/2003 | Andren et al. | | |
| 6,625,197 B1 | 9/2003 | Lundby et al. | | |
| 6,738,608 B2 * | 5/2004 | Black et al. | .................. | 455/260 |
| 6,753,812 B2 * | 6/2004 | Rabinowitz et al. | ......... | 342/464 |
| 6,795,452 B2 * | 9/2004 | Iancu | .......................... | 370/515 |
| 6,839,380 B1 * | 1/2005 | Ding et al. | ................... | 375/149 |
| 6,891,886 B2 * | 5/2005 | Doetsch et al. | ............. | 375/150 |
| 6,912,244 B2 * | 6/2005 | Challa et al. | ................. | 375/149 |
| 6,975,676 B1 * | 12/2005 | Goodson et al. | ............ | 375/231 |
| 7,010,019 B2 * | 3/2006 | Reial | .......................... | 375/148 |
| 7,010,073 B2 * | 3/2006 | Black et al. | ................. | 375/355 |
| 7,062,284 B2 * | 6/2006 | Vihriala | ...................... | 455/506 |
| 7,106,784 B2 * | 9/2006 | Eltawil et al. | ............... | 375/148 |
| 7,139,305 B2 * | 11/2006 | Gavnoudias et al. | ........ | 375/147 |
| 7,154,872 B2 * | 12/2006 | Hsuan | ......................... | 370/335 |
| 7,203,220 B2 * | 4/2007 | Baltersee et al. | ............ | 375/145 |
| 7,251,268 B2 * | 7/2007 | Ali | ............................. | 375/150 |
| 7,263,349 B2 * | 8/2007 | Sih et al. | .................. | 455/414.1 |
| 7,333,532 B2 * | 2/2008 | Baltersee et al. | ............ | 375/148 |
| 7,372,892 B2 * | 5/2008 | Li | ............................... | 375/147 |
| 2001/0014114 A1 * | 8/2001 | Baltersee et al. | ............ | 375/148 |
| 2002/0018518 A1 * | 2/2002 | Subramanian et al. | ...... | 375/147 |
| 2002/0037027 A1 * | 3/2002 | Medlock et al. | ............. | 375/147 |
| 2002/0037028 A1 * | 3/2002 | Baltersee et al. | ............ | 375/148 |
| 2002/0039383 A1 * | 4/2002 | Zhu et al. | .................... | 375/214 |
| 2002/0044618 A1 * | 4/2002 | Buchwald et al. | ........... | 375/355 |

(Continued)

*Primary Examiner*—Temesghen Ghebretinsae
(74) *Attorney, Agent, or Firm*—Roylance, Abrams, Berdo & Goodman, L.L.P.

(57) ABSTRACT

A tracking apparatus and method are provided which can reduce the effects of multipath interference which occurs when a receiving end of a mobile communication system tracks a received signal. The tracking apparatus includes an interference remover for removing an interference component contained in an early energy signal and a late energy signal which are used for tracking.

8 Claims, 6 Drawing Sheets

U.S. PATENT DOCUMENTS

| | | | |
|---|---|---|---|
| 2002/0057729 A1* | 5/2002 | Farbod et al. | 375/150 |
| 2002/0080862 A1* | 6/2002 | Ali | 375/148 |
| 2002/0181635 A1* | 12/2002 | Doetsch et al. | 375/354 |
| 2003/0108136 A1* | 6/2003 | Wang et al. | 375/354 |
| 2003/0138030 A1* | 7/2003 | Gavnoudias et al. | 375/141 |
| 2003/0142726 A1* | 7/2003 | Eltawil et al. | 375/146 |
| 2003/0176201 A1* | 9/2003 | Sih et al. | 455/502 |
| 2003/0186714 A1* | 10/2003 | Vihriala | 455/506 |
| 2003/0202488 A1* | 10/2003 | Hsuan | 370/331 |
| 2003/0223392 A1* | 12/2003 | Iancu | 370/335 |
| 2003/0227962 A1* | 12/2003 | Hintz-Madsen | 375/148 |
| 2004/0029609 A1* | 2/2004 | Li | 455/550.1 |
| 2004/0071197 A1* | 4/2004 | Lin | 375/148 |
| 2004/0071198 A1* | 4/2004 | Lomp et al. | 375/148 |
| 2009/0074037 A1* | 3/2009 | Kim | 375/148 |

* cited by examiner

TRACKING APPARATUS AND METHOD FOR A MOBILE COMMUNICATION SYSTEM

CLAIM OF PRIORITY

This application claims the benefit under 35 U.S.C. §119 (a) of an application entitled TRACKING DEVICE AND METHOD OF MOBILE COMMUNICATION SYSTEM filed in the Korean Intellectual Property Office on Aug. 18, 2004 and assigned Serial No. 2004-65226, the entire contents of which are hereby incorporated by reference.

BACKGROUND OF THE INVENTION

1. Field of the Invention

The present invention relates to a tracking apparatus and method for a mobile communication system. More particularly, the present invention relates to a tracking apparatus and method for reducing effects of multipath interference in a mobile communication system.

2. Description of the Related Art

Tracking, such as synchronization and acquisition of a received signal, is a process performed at a receiving end of a mobile communication system. The necessity of tracking is described below with reference to the accompanying drawings.

Figure 1A:
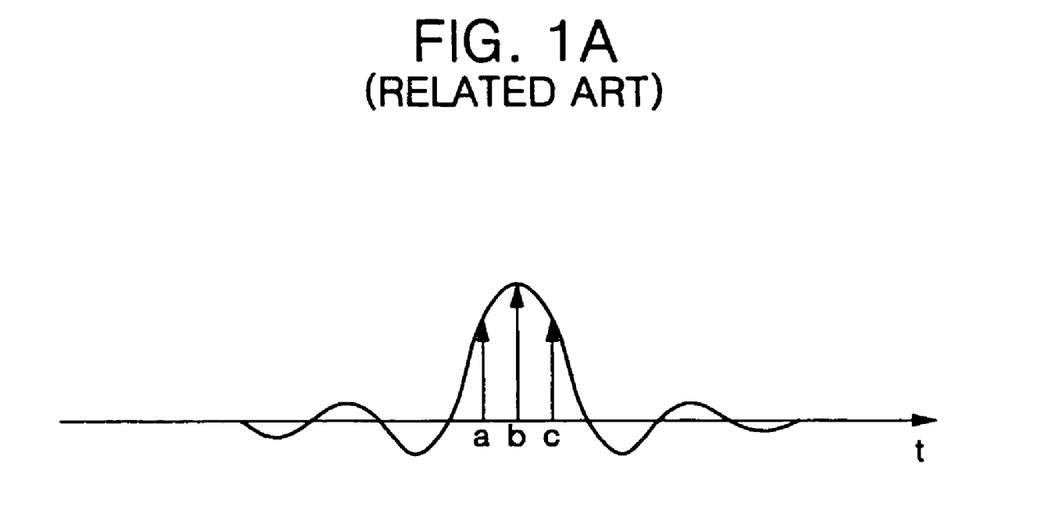
FIGS. 1A and 1B are diagrams illustrating types of signals received at a receiving end of a mobile communication system.
Figure 1B:
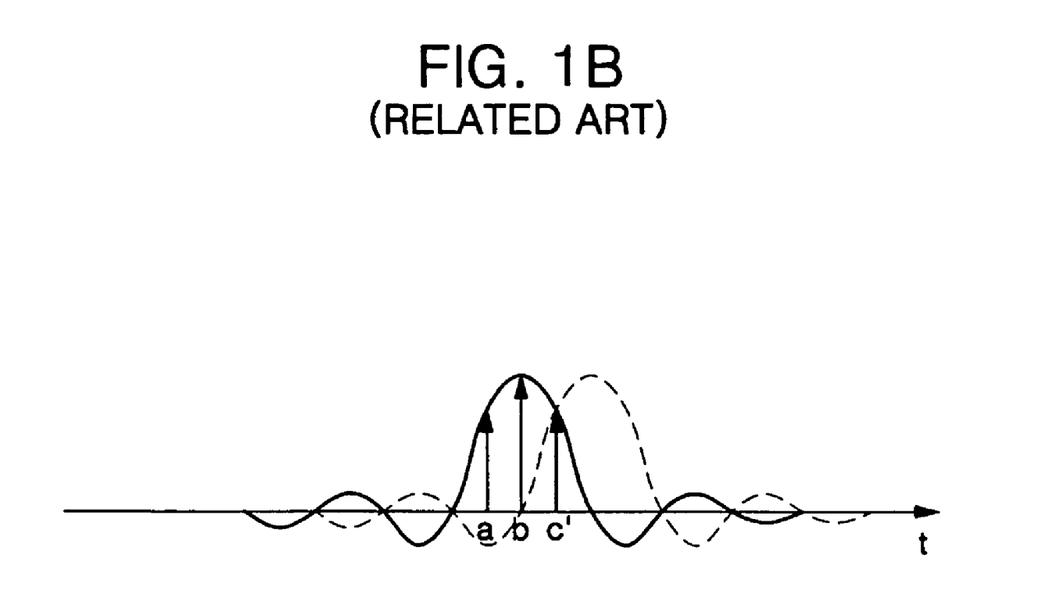

FIGS. 1A and 1B are diagrams illustrating types of signals received at a receiving end of a mobile communication system.

FIG. 1A shows a received signal in a mobile communication environment where multipath interference does not occur, and FIG. 1B shows a received signal in a mobile communication environment where multipath interference occurs. In FIGS. 1A and 1B, time is plotted on the horizontal axis and a power level of the received signal is plotted on the vertical axis.

The signal received at the receiving end of the mobile communication system, as shown in FIG. 1A, has a bilateral symmetrical structure which is symmetrical about the highest power level which is position b. The higher the power level of the signal, the better the signal processing. Thus, it is efficient to receive and process the highest power level position b of the received signal. Accordingly, the receiving end should extract the highest power level position b of the received signal. As described above, extracting the highest power level position b from the received signal is referred to as tracking. Tracking is performed at a receiver. In the code division multiple access (CDMA) system, a rake receiver is typically used, and tracking is performed by a tracking apparatus of the rake receiver. Tracking is performed at both a mobile station and a base transceiver system (BTS).

Tracking is performed using a symmetrical bilateral feature of the signal. That is, the power level of the signal is bilaterally symmetrical about the highest position b, and so two positions a and c positioned the same distance from the highest power level position b have the same power level.

The tracking process using such a feature is as follows.

First, a certain position is extracted from the received signal and set as a candidate for the highest power level position. Two symmetrical positions from the candidate highest power level position are extracted, and power levels of the two positions are compared. If the two positions have the same power level, the candidate highest power level position is determined as the highest power level position. If the two positions do not have the same power level, a center position for which two equidistant side positions have the same power level is searched for and finally set as the highest power level position. In this manner, the highest power level point b is extracted.

Tracking is performed as follows.

As described above, tracking is performed under the assumption that the power level of the received signal is bilaterally symmetrical. However, the actual mobile communication environment undergoes multipath interference due to the reflection of signals by obstacles such as buildings. In a mobile communication environment having multipath interference, as shown in FIG. 1B, the same signals are received with a time difference. Here, the power level of the received signal recognized by the receiving end is represented by the sum of the power levels of the received signals with the time difference. That is, the signal received in the environment in which multipath interference occurs is not symmetrical. Thus, in the environment in which multipath interference occurs, accurate tracking cannot be performed by the conventional tracking apparatus and method which perform tracking under the assumption that the power level of the received signal is bilaterally symmetrical.

Meanwhile, the conventional tracking technique is performed separately for respective paths and thus is affected by interference resulting from paths other than a path for which tracking is currently performed. Further, a raised cosine filter usually used in the CDMA system has paths which are too close to each other, and thus the effects of interference are increased. As a result, a phenomenon of two close paths merging occurs. Due to such a merging phenomenon, the mobile communication system operating in the environment in which multipath interference occurs cannot achieve a path diversity gain. This results in diminished performance.

SUMMARY OF THE INVENTION

It is an objective of the present invention to provide a tracking apparatus and method for reducing effects of multipath interference in a mobile communication system.

The present invention provides a tracking apparatus of a mobile communication system, comprising a signal extractor for extracting an on-time energy signal, an early energy signal, and a late energy signal from a received signal, an early energy interference remover for removing a multipath interference component contained in the early energy signal, a late energy interference remover for removing a multipath interference component contained in the late energy signal, and a location estimator for comparing the amplitude of the interference-removed early energy output from the early energy interference remover and the amplitude of the interference-removed late energy output from the late energy interference remover to determine whether an accurate receiving position is extracted.

The present invention also provides a tracking method of a mobile communication system, comprising the steps of extracting an on-time energy signal, an early energy signal, and a late energy signal from a received signal, calculating an interference-removed early energy using the extracted on-time energy signal and early energy signal, calculating an interference-removed late energy using the extracted on-time energy signal and late energy signal, and comparing the amplitude of the interference-removed early energy and the amplitude of the interference-removed late energy to determine whether an accurate receiving position is extracted.

BRIEF DESCRIPTION OF THE DRAWINGS

The above and other features and advantages of the present invention will become more apparent as the invention is better understood by considering the following detailed description together with the attached drawings, in which.

Throughout the drawings, the same or similar elements are denoted by the same reference numerals.

DETAILED DESCRIPTION OF EXEMPLARY EMBODIMENTS

The present invention will now be described more fully with reference to the accompanying drawings, in which exemplary embodiments of the invention are shown. This invention may, however, be embodied in different forms and should not be construed as limited to the exemplary embodiments set forth herein. Descriptions of matters well known in the art or descriptions unnecessary to fully understand the present invention will be omitted below to preserve concision and clarity.

The tracking apparatus and method of the present invention estimate original locations of paths without undergoing a path merging phenomenon which occurs in a multipath environment. The tracking apparatus and method of the present invention can be used in a non-coherent type mobile communication system.

Figure 2:
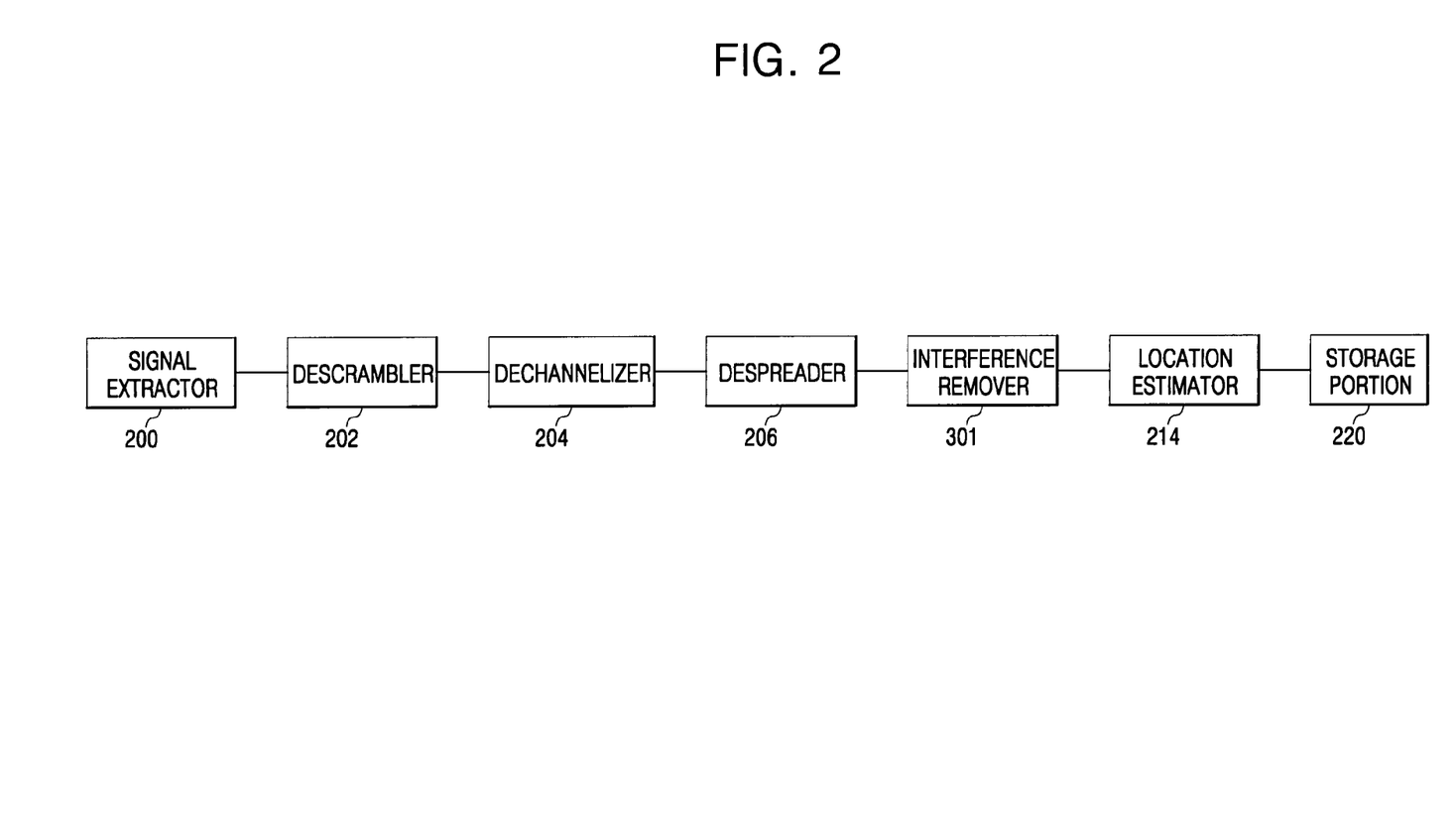
FIG. 2 is a block diagram illustrating an exemplary tracking apparatus according to an exemplary embodiment of the present invention.

FIG. 2 is a block diagram illustrating an exemplary tracking apparatus according to an exemplary embodiment of the present invention.

As shown in FIG. 2, the tracking apparatus according to an exemplary embodiment of the present invention comprises a signal extractor 200, a descrambler 202, a dechannelizer 204, a despreader 206, an interference remover 301, a location estimator 214, and a storage portion 220.

The signal extractor 200 generates an on-time energy signal, an early energy signal, and a late energy signal from the received signal and outputs them to the descrambler 202.

The descrambler 202 descrambles the three signals received from the signal extractor 202 into non-scrambled signals and outputs them to the dechannelizer 204. The dechannelizer 204 dechannelizes the three signals received from the descrambler 202 into dechannelized signals and outputs them to the despreader 206. The despreader 206 despreads the three signals received from the dechannelizer 204 into despread signals and outputs them to the interference remover 301.

The interference remover 301 removes an interference component contained in the early energy signal and the late energy signal and outputs signals having no interference components to the location estimator 214. The interference remover 301 calculates energy values of the respective signals in order to remove the interference. A principle for removing the interference component will be described later with reference to FIG. 3 and equations. The location estimator 214 determines whether tracking is accurately performed using the interference-removed signals received from the interference remover 301. That is, the location estimator 214 determines whether accurate tracking is performed, such as whether an accurate receiving position is extracted, by comparing the interference-removed early energy signal amplitude and the interference-removed late energy signal amplitude. The location estimator 214 determines that accurate tracking is performed if the early energy signal and the late energy signal have the same amplitude. The storage portion 220 stores data used for the exemplary embodiments of the present invention.

The principle for removing the interference component according to an exemplary embodiment of the present invention is explained below with reference to FIG. 3 and equations.

Figure 3:
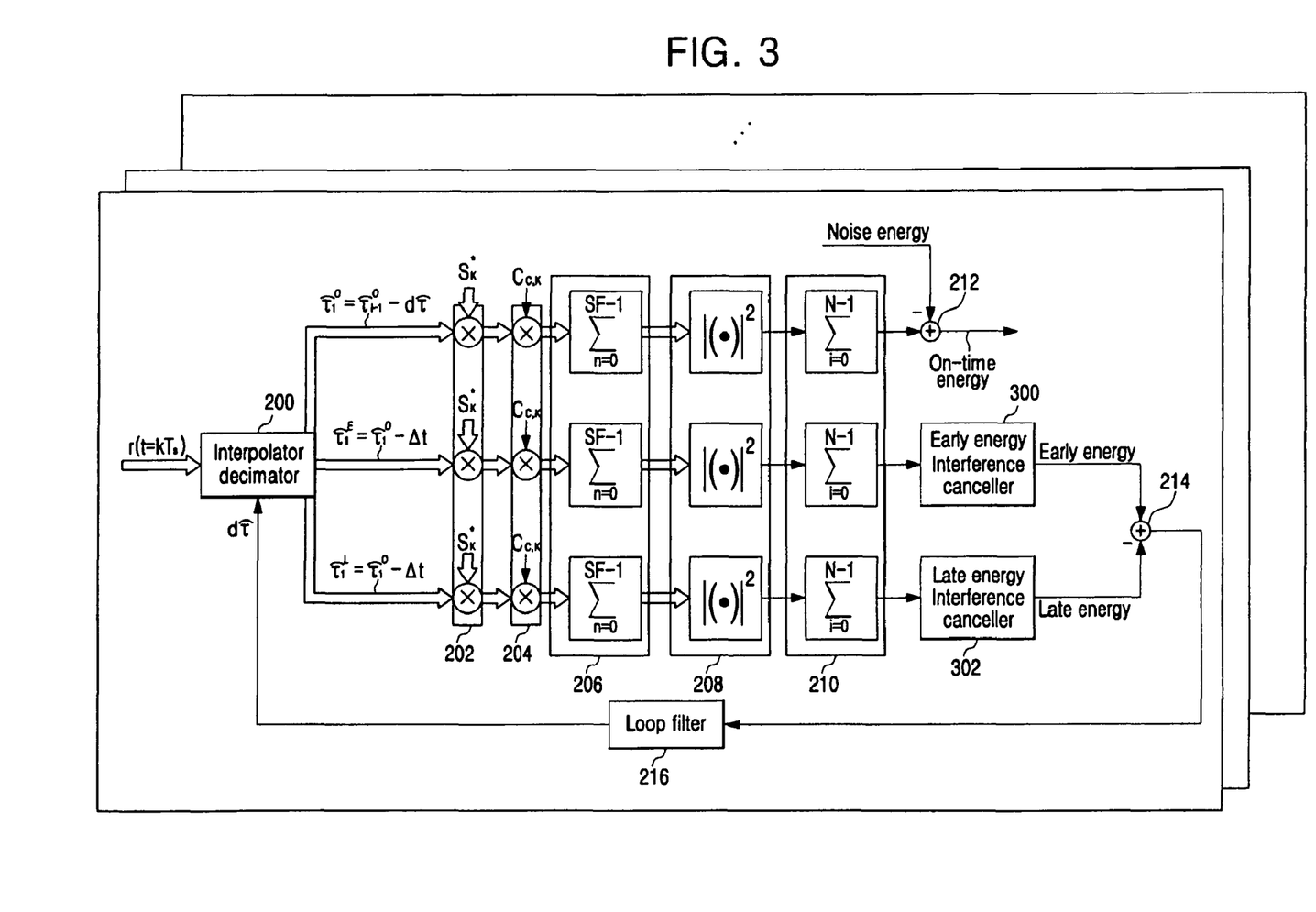
FIG. 3 is a detailed diagram illustrating the exemplary tracking apparatus according to an exemplary embodiment of the present invention.

FIG. 3 is a detailed diagram illustrating an exemplary tracking apparatus according to an exemplary embodiment of the present invention.

FIG. 3 shows a path for processing the on-time energy signal, the early energy signal, and the late energy signal. As shown in FIG. 3, the tracking apparatus of an exemplary embodiment of the present invention comprises the signal extractor 200 which generates the on-time energy signal, the early energy signal, and the late energy signal from the received signal, the descrambler 202 which respectively descrambles the on-time energy signal, the early energy signal, and the late energy signal from the received signal into the non-scrambled signals, the dechannelizer 204 which respectively dechannelizes the descrambled on-time energy signal, early energy signal, and late energy signal into dechannelized signals, the despreader 206 which despreads the dechannelized on-time energy signal, early energy signal, and late energy signal into despread signals, an energy calculator 208 which respectively calculates power levels of the despread on-time energy signal, early energy signal, and late energy signal, a section energy calculator 210 which calculates an energy corresponding to a predetermined section, a summation unit 212 which sums a noise energy and the on-time energy, an early energy interference remover 300 which removes an interference component contained in the early energy, a late energy interference remover 302 which removes interference component contained in the late energy, the location estimator 214 which determines whether accurate tracking is performed by comparing amplitudes of the interference-removed early energy and late energy, and a feedback circuit containing a loop filter 216 for obtaining a stable signal.

The signal extractor 200 comprises an interpolator and a decimator. The received signal is converted into a signal having a desired rate by the interpolator, a location such as a path delay of the on-time energy signal is adjusted using a fed back signal received from the loop filter 216, and then the on-time energy signal, the early energy signal, and the late energy signal are extracted by the decimator.

The early energy interference remover 300 and the late energy interference remover 302 obtain the interference-removed early energy and late energy.

The location estimator 214 is a component corresponding to the location estimator 214 of FIG. 2. As described above, the location estimator 214 compares amplitudes of the interference-removed early energy and late energy to determine whether accurate tracking is performed. Here, a summation unit is used as the location estimator 214 based on such a characteristic. Comparison of amplitudes of the two signals is performed by converting one of the two signals into a negative value and summing the converted signal and the other signal. Here, a summation result of "0" indicates that the amplitudes of the two signals are the same, a positive summation result indicates the negative signal has a smaller amplitude than the other signal, and a negative summation result indicates the negative signal has a greater amplitude than the other signal. The location estimator 214 checks whether an accurate receiving position of the received signal is extracted by comparing the amplitudes of the interference-removed early energy and late energy which are output from the early energy interference remover 300 and the late energy interference remover 302. That is, the location estimator 214 checks whether the extracted position of the on-time energy signal is the highest power level position b of FIG. 1. The location estimator 214 determines that an accurate receiving position is extracted if the early energy and the late energy have the same amplitude.

The location estimator 214 compares the early energy and the late energy by converting one of the early energy value and the late energy value into a negative value and summing the negative value and the other energy value which is a positive value. A difference value between the early energy and the late energy which is an output from the location estimator 214 is fed back to the signal extractor 200 to be used for extracting the on-time energy signal, the early energy signal, and the late energy signal.

In FIG. 3, big arrows denote portions where both I and Q channels exist. The tracking apparatus of the present invention comprises the interpolator and the decimator. The received signal is converted into a signal having a desired rate by the interpolator, a location such as a path delay of the on-time energy signal is adjusted using a fed-back signal received from the loop filter 216, and then the on-time energy signal, the early energy signal and the late energy signal are extracted by the decimator. In FIG. 3, $\hat{\tau}_l^O$ represents an estimated location of the on-time energy signal, $\hat{\tau}_l^E$ represents an estimated location of the early energy signal, and $\hat{\tau}_l^L$ represents an estimated location of the late energy signal. $\Delta\tau$ represents a time offset for the early and late energies and is usually a value of $T_c/2$. $T_c$ represents a chip interval.

The three signals generated from the signal extractor 200 are converted through the descrambler 202, the dechannelizer 204, and the despreader 206.

The energy calculator 208 calculates energies of the on-time energy signal, the early energy signal, and the late energy signal. The energy calculator 208 calculates the energies such that I and Q channel signals of the descrambled signals are squared and then added. The section energy calculator 210 adds an energy value calculated by the energy calculator 208 by N times to obtain an energy corresponding to N sections.

Meanwhile, the on-time energy of N section contains the noise energy. Thus, in order to make pure on-time energy, the noise energy is subtracted from the on-time energy output from the section signal extractor 210. The subtracting process is performed at the summation unit 212. The subtracting process corresponds to a process for converting one of the two signals into a negative value and summing the converted signal value and the other signal value.

The early energy and the late energy whose interference are respectively removed by the early energy interference remover 300 and the late energy interference remover 302 undergo the subtracting process of the location estimator 214 to be converted into a value used for tracking. The difference between the early energy and the late energy is converted into a processed value through the loop filter 216, which is compared to a predetermined threshold value to determine $d\hat{\tau}$ and then is transmitted to the decimator. In order to cope with an erratic channel, the difference between the early energy and the late energy can be divided into the basic on-time energy and used.

Operation of the tracking apparatus of FIG. 3 is described with reference to the following equations.

A signal transmitted by the transmitter of the CDMA system in which both the transmitter and the receiver employ a pulse shaping filter can be expressed by Equation 1:

$$b(t) = \sqrt{M} \sum_k d_k g(t - kT_c) \qquad \text{Equation 1}$$

In Equation 1, $d_k$ represents a chip to be transmitted and has a complex number value. $g(t)$ represents the pulse shaping filter. A square root raised cosine filter is usually used as the pulse shaping filter. For convenience, the following equations are derived based on the assumption that a control signal is transmitted over the Q channel. However, the equations can be derived by a similar method if the control signal is transmitted over the I channel or I and Q channels (QPSK). $d_k$ of Equation 1 is given by Equation 2:

$$d_k = (S_d(n)c_{d,k} + jS_c(i)c_{c,k})s_k \qquad \text{Equation 2}$$

In Equation 2, $S_k$ represents a scrambling sequence and has a complex number value. $S_d(n)$ represents data information to be transmitted and represents a value which changes in units of a spreading factor of data information, and $S_c(i)$ represents control information to be transmitted and represents a value which changes in units of a spreading factor of control information. $C_{d,k}$ and $c_{c,k}$ represents a channelization sequence and have a characteristic of being orthogonal to each other and repeated at every spreading factor.

A signal transmitted over a fading channel comprised of L multipaths and passes through the pulse shaping filter of the receiver is given by Equation 3:

$$r(t) = \left(\sum_{l=0}^{L-1} \{a_l(t)b(t - \tau_l)\} + n(t)\right) * g(t)$$

$$= \left(\sqrt{M} \sum_{l=0}^{L-1} \left\{a_l(t) \sum_k \{d_k g(t - \tau_l - kT_c)\}\right\}\right) * g(t) +$$

$$n(t) * g(t)$$

$$= \sqrt{M} \sum_{l=0}^{L-1} \left\{a_l(t) \sum_k \{d_k G(t - \tau_l - kT_c)\}\right\} + n_r(t)$$

Equation 3

$a_l(t)$ of Equation 3 is given by Equation 4:

$$a_l(t) = A_l(t)(\cos(\theta_l(t)) + j\sin(\theta_l(t))) \qquad \text{Equation 4}$$

$n(t)$ of Equation 3 represents Gaussian white noise, and $G(t)$ is defined by Equation 5:

$$G(t) = g(t) * g(t) = \int_{-\infty}^{\infty} g(\tau)g(t - \tau)d\tau \qquad \text{Equation 5}$$

$n_r(t)$ represents filtered noise having a Gaussian distribution.

A signal which has undergone m-th path despreading obtained using Equation 3 is given by Equation 6:

$$DesSig_m(i, \Delta) = \sum_{n=0}^{SF-1} r((n + i \cdot SF)T_c + \tau_m + \Delta)s_{n+i \times SF}^* c_{c,n} \qquad \text{Equation 6}$$

$$= \sqrt{M} \sum_{n=0}^{SF-1} \left\{a_m((n + i \cdot SF)T_c + \tau_m + \Delta)\right.$$

$$\left.\sum_k \{d_k G((n + i \cdot SF)T_c + \Delta - kT_c))\}s_{n+i \times SF}^* c_{c,n}\right\} +$$

$$\sqrt{M} \sum_{n=0}^{SF-1} \left\{\sum_{l=0, l \neq m}^{L-1} \left\{a_l((n + i \cdot SF)T_c + \tau_m + \Delta)\right.\right.$$

$$\left.\left.\sum_k \{d_k G((n + i \cdot SF)T_c + \tau_m + \Delta - \tau_l - kT_c))\}s_{n+i \times SF}^* c_{c,n}\right\}\right\} +$$

$$\sum_{n=0}^{SF-1} \{n_r((n + i \cdot SF)T_c + \tau_m + \Delta)s_{n+i \times SF}^* c_{c,n}\}$$

$$= \sqrt{M} \cdot jS_c(i)G(\Delta) \sum_{n=0}^{SF-1} \{a_m((n + i \cdot SF)T_c + \tau_m + \Delta)\} +$$

-continued $$\sqrt{M}\sum_{n=0}^{SF-1}\left\{\sum_{l=0,l\neq m}^{L-1}\left\{a_l((n+i\cdot SF)T_c+\tau_m+\Delta)jS_c(i)G(\tau_m-\tau_l+\Delta))\right\}\right\}+n_{m,t}(i,\Delta)$$

In Equation 6, SF represents a spreading factor of control information. $n_{m,t}(i,\Delta)$ contains filtered noise and noise resulting from correlation of a scrambling sequence. $n_{m,t}(i,\Delta)$ also has a Gaussian distribution. If it is assumed that a channel variation ($a_l(t)$) within one symbol, such as a section of a spreading factor, can be ignored, Equation 6 can be written as Equation 7:

$$DesSig_m(i,\Delta)\cong\sqrt{M}\,(SF\cdot a_m(i)\cdot jS_c(i)G(\Delta))+ \quad\text{Equation 7}$$

$$\sqrt{M}\sum_{l=0,l\neq m}^{L-1}\{SF\cdot a_l(i)\cdot jS_c(i)G(\tau_m-\tau_l+\Delta)\}+$$

$$n_{m,t}(i,\Delta)$$

$$=-\sqrt{M}\cdot SF\cdot A_m(i)\sin(\theta_m(i))S_c(i)G(\Delta)-$$

$$\sum_{l=0,l\neq m}^{L-1}\{\sqrt{M}\cdot SF\cdot A_l(i)\sin(\theta_l(i))S_c(i)G(\tau_m-\tau_l+\Delta)\}+$$

$$n_{m,t}^I(i,\Delta)+j\{\sqrt{M}\cdot SF\cdot A_m(i)\cos(\theta_m(i))S_c(i)G(\Delta)+$$

$$\sum_{l=0,l\neq m}^{L-1}\{\sqrt{M}\cdot SF\cdot A_l(i)\cos(\theta_l(i))S_c(i)G(\tau_m-\tau_l+\Delta)\}+$$

$$n_{m,t}^Q(i,\Delta)\}$$

If it is assumed that a channel variation of a pilot section can be ignored where there is a pilot section that knows $S_c(i)$, so that an energy of Equation 8 can be obtained using Equation 7 after performing coherent addition during a pilot section, the energy of Equation 8 can be obtained by changing SF into $SF\cdot N_p$ and regarding i as an index of a unit for obtaining an energy other than a symbol. Here, $N_p$ represents the number of pilots.

The energy obtained using Equation 7 is given by Equation 8:

$$DesEng_m(i,\Delta)\cong M(SF\cdot A_m(i)\cdot S_c(i)G(\Delta))^2+ \quad\text{Equation 8}$$

$$M\sum_{l=0,l\neq m}^{L-1}(SF\cdot A_l(i)\cdot S_c(i)G(\tau_m-\tau_l+\Delta))^2+$$

$$n_{m,t}^I(i,\Delta)^2+n_{m,t}^Q(i,\Delta)^2+n_{m,o}(i,\Delta)$$

$$=M(SF\cdot A_m(i)G(\Delta))^2+$$

$$M\sum_{l=0,l\neq m}^{L-1}(SF\cdot A_l(i)G(\tau_m-\tau_l+\Delta))^2+$$

$$n_{m,t}(i,\Delta)^2+n_{m,o}(i,\Delta)$$

$n_{m,o}(i,\Delta)$ of Equation 8 is defined by Equation 9:

$$n_{m,o}(i,\Delta)=2\cdot SF^2\cdot A_m(i)G(\Delta)\sin(\theta_m(i)) \quad\text{Equation 9}$$

$$\sum_{l=0,l\neq m}^{L-1}\{A_l(i)G(\tau_m-\tau_l+\Delta)\sin(\theta_l(i))\}-$$

$$2\cdot SF\cdot A_m(i)G(\Delta)\sin(\theta_m(i))n_{m,t}^I(i)-$$

$$2\sum_{l=0,l\neq m}^{L-1}\{SF\cdot A_l(i)G(\tau_m-\tau_l+\Delta)\sin(\theta_l(i))\}\cdot n_{m,t}^Q(i)+$$

$$2\cdot SF_2\cdot A_m(i)G(\Delta)\cos(\theta_m(i))$$

$$\sum_{l=0,l\neq m}^{L-1}\{A_l(i)G(\tau_m-\tau_l+\Delta)\cos(\theta_l(i))\}+$$

$$2\cdot SF\cdot A_m(i)G(\Delta)\cos(\theta_m(i))n_{m,t}^I(i)+$$

$$2\sum_{l=0,l\neq m}^{L-1}\{A_l(i)G(\tau_m-\tau_l+\Delta)\cos(\theta_l(i))\}n_{m,t}^Q(i)$$

Since a phase offset varies and is independent for respective paths in the fading environment, a means value of $n_{m,o}(i,\Delta)$ of Equation 9 is "0", such as Equation 10:

$$E[n_{m,o}(i,\Delta)]=0 \quad\text{Equation 10}$$

The on-time energy, the early energy, and the late energy obtained by using Equation 8 are defined by Equations 11 to 13, respectively:

$$OnEng_m(i)=DesEng_m(i,0)\cong M(SF\cdot A_m(i)G(0))^2+ \quad\text{Equation 11}$$

$$M\sum_{l=0,l\neq m}^{L-1}(SF\cdot A_l(i)G(\tau_m-\tau_l))^2+n_{m,t}(i,0)^2+n_{m,o}(i,0)$$

$$EarlyEng_m(i)=DesEng_m(i,-\Delta t)\cong M(SF\cdot A_m(i)G(-\Delta t))^2+ \quad\text{Equation 12}$$

$$M\sum_{l=0,l\neq m}^{L-1}(SF\cdot A_l(i)G(\tau_m-\tau_l-\Delta t))^2+$$

$$n_{m,t}(i,-\Delta t)^2+n_{m,o}(i,-\Delta t).$$

$$LateEng_m(i)=DesEng_m(i,\Delta t)\cong M(SF\cdot A_m(i)G(\Delta t))^2+ \quad\text{Equation 13}$$

$$M\sum_{l=0,l\neq m}^{L-1}(SF\cdot A_l(i)G(\tau_m-\tau_l+\Delta t))^2+$$

$$n_{m,t}(i,\Delta t)^2+n_{m,o}(i,\Delta t).$$

In Equation 11, $\Delta t$ is usually used as $T_c/2$. $n_{m,t}(i,0)$ of Equation 11 represents a term removed according to the noise energy estimated in Equation 14, and $n_{m,t}(i,-\Delta t)^2$ and $n_{m,t}(i,\Delta t)^2$ of Equations 12 and 13 represent terms removed during the process for subtracting the early energy and the late energy using Equation 15.

$$E[n_{m,t}(i,0)^2-\hat{n}_m(i)^2]=0 \quad\text{Equation 14.}$$

$$E[n_{m,t}(i,-\Delta t)^2-n_{m,t}(i,\Delta t)^2]=0 \quad\text{Equation 15.}$$

Thus, the pure early energy and late energy can be obtained by subtracting the second term from Equations 12 and 13.

It is necessary to know $\tau_m-\tau_1-\Delta t$ and $M\cdot SF^2\cdot A_l(i)^2$ of the respective paths in order to estimate the second term of Equation 12. $\tau_m-\tau_1-\Delta t$ represents a value which can be obtained, by using a location value $\hat{\tau}_l$ which is currently estimated, by a searcher and a finger of the receiving end. $M\cdot SF^2\cdot A_l(i)^2$ can be estimated by Equation 16 which removes a noise estimation value from the on-time energy of Equation 11.

$$ROnEng_m(i)=OnEng_m(i)-\hat{n}_m(i)^2\cong M(SF\cdot A_m(i)G(0))^2+ \quad\text{Equation 16}$$

$$M\sum_{l=0,l\neq m}^{L-1}(SF\cdot A_l(i)G(\tau_m-\tau_l))^2+n_{m,r}(i)$$

In Equation 16, $E[n_{m,r}(i)]=0$ and $G(0)=1$ at a pulse shaping filter, and thus in Equation 16 the second term is a very small value, $ROnEng_m(i)$ has a value similar to $M\cdot SF^2\cdot A_l(i)^2$. If $G(t)$ is the raised cosine filter, a value of $G(t)^2$ in which a Roll-off factor is 0.22 is shown in Table 1. Table 1 shows positive values since $G(t)^2$ is symmetrical about "0".

TABLE 1

| | t | | | | | | |
|---|---|---|---|---|---|---|---|
| | 0 | $T_c/8$ | $T_c2/8$ | $T_c3/8$ | $T_c4/8$ | $T_c5/8$ | $T_c6/8$ |
| $G(t)^2$ | 1.000000 | 0.948299 | 0.805996 | 0.607208 | 0.396206 | 0.213689 | 0.085579 |

| | t | | | | | | |
|---|---|---|---|---|---|---|---|
| | $T_c7/8$ | $T_c$ | $T_c9/8$ | $T_c10/8$ | $T_c11/8$ | $T_c12/8$ | $T_c13/8$ |
| $G(t)^2$ | 0.018077 | 0.000000 | 0.010446 | 0.028109 | 0.038473 | 0.036631 | 0.025688 |

It can be seen from Table 1 that $G(t)^2$ has a value much smaller than "1" in the case of more than 0.75 chip. Thus, in the case of more than 0.75 chip, Equation 16 can yield a value similar to $M \cdot SF^2 \cdot A_l(i)^2$. The pure energy of Equations 12 and 13 from which the interference term is removed can be expressed by Equations 17 and 18.

$$REarlyEng_m(i) = \qquad \text{Equation 17}$$
$$EarlyEng_m(i) - \sum_{l=0, l \neq m}^{L-1} ROnEng_m(i) \cdot G(\hat{\tau}_m - \hat{\tau}_l - \Delta t)^2$$

$$RLateEng_m(i) = \qquad \text{Equation 18}$$
$$LateEng_m(i) - \sum_{l=0, l \neq m}^{L-1} ROnEng_m(i) \cdot G(\hat{\tau}_m - \hat{\tau}_l + \Delta t)^2$$

As the energy used in tracking uses a value obtained by non-coherently adding a N– number of symbols, Equations 16 to 18 can be written as Equations 19 to 21:

$$NROnEng_m = \sum_{i=0}^{N-1} ROnEng_m(i) \qquad \text{Equation 19}$$
$$= \sum_{i=0}^{N-1} OnEng_m(i) - \sum_{i=0}^{N-1} \hat{n}_m(i)^2$$
$$= NOnEng_m - NoiseEng_m.$$

$$NREarlyEng_m = \sum_{i=0}^{N-1} REarlyEng_m(i) \qquad \text{Equation 20}$$
$$= \sum_{i=0}^{N-1} \{EarlyEng_m(i) -$$
$$\sum_{l=0, l \neq m}^{L-1} ROnEng_l(i) \cdot$$
$$G(\hat{\tau}_m - \hat{\tau}_l - \Delta t)^2$$
$$= \sum_{i=0}^{N-1} EarlyEng_m(i) -$$
$$\sum_{l=0, l \neq m}^{L-1} G(\hat{\tau}_m - \hat{\tau}_l - \Delta t)^2$$
$$\sum_{i=0}^{N-1} ROnEng_l(i)$$
$$= NEarlyEng_m -$$
$$\sum_{l=0, l \neq m}^{L-1} G(\hat{\tau}_m - \hat{\tau}_l - \Delta t)^2 \cdot$$
$$NROnEng_l$$

$$NRLateEng_m = \sum_{i=0}^{N-1} RLateEng_m(i) \qquad \text{Equation 21}$$
$$= \sum_{i=0}^{N-1} \{LateEng_m(i) -$$
$$\sum_{l=0, l \neq m}^{L-1} ROnEng_l(i) \cdot$$
$$G(\hat{\tau}_m - \hat{\tau}_l + \Delta t)^2$$
$$= \sum_{i=0}^{N-1} LateEng_m(i) -$$
$$\sum_{l=0, l \neq m}^{L-1} G(\hat{\tau}_m - \hat{\tau}_l + \Delta t)^2$$
$$\sum_{i=0}^{N-1} ROnEng_l(i)$$
$$= NLateEng_m -$$
$$\sum_{l=0, l \neq m}^{L-1} G(\hat{\tau}_m - \hat{\tau}_l + \Delta t)^2 \cdot$$
$$NROnEng_l$$

That is, Equation 20 corresponds to the interference-removed early energy, and Equation 21 corresponds to the interference-removed late energy. Thus, the early energy interference remover 300 and the late energy interference remover 302 operate according to Equations 20 and 21.

Meanwhile, in Table 1, it can be seen that the RC filter energy is close to "0" if a t value greatly deviates from a predetermined amplitude. Thus, the above processes can be simplified based on the assumptions of Equations 22 and 23:

$$G(t \geq \Delta w)^2 \cong 0 \qquad \text{Equation 22.}$$

$$G(t \leq -\Delta w)^2 \cong 0 \qquad \text{Equation 23.}$$

Operation of the early energy interference remover 300 according to an exemplary embodiment of the present invention is explained below with reference to FIG. 4.

Figure 4:
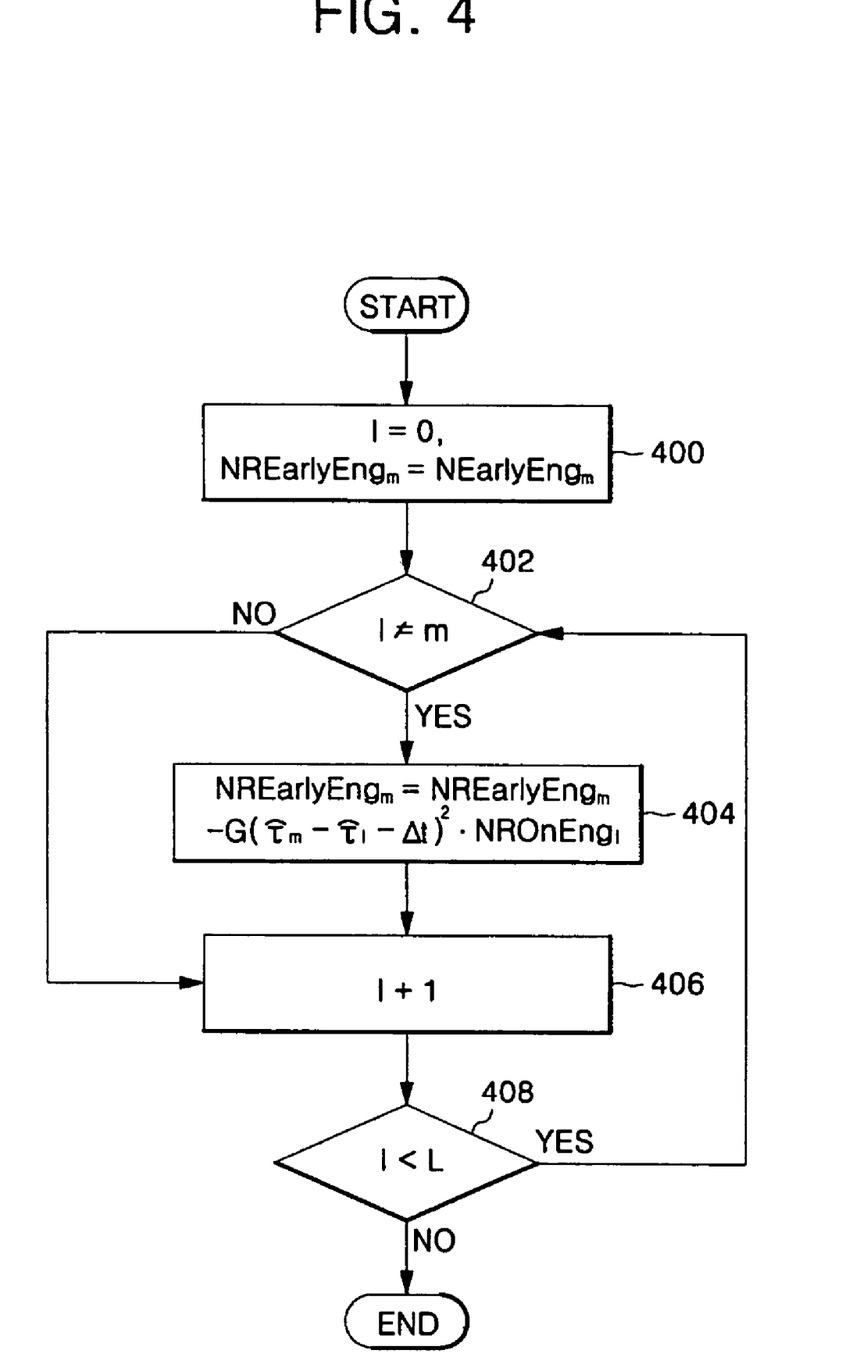
FIG. 4 is a flowchart illustrating an exemplary process for removing an interference component from an early energy signal according to an exemplary embodiment of the present invention.

FIG. 4 is a flowchart illustrating an exemplary process for removing an interference component from the early energy signal according to an exemplary embodiment of the present invention.

In FIG. 4, l is a variable, m represents a number of a current path, and L represents a total path number.

In a step 400, the early energy interference remover 300 is initialized to l=0 and $NREarlyEng_m = NEarlyEng_m$. In a step 402, the early energy interference remover 300 compares l and m. Here, the early energy interference remover 300 performs a step 404 if l and m are different numbers, and the early energy interference remover 300 performs a step 406 if l and m are the same number.

In step 404, the early energy interference remover 300 calculates $NREarlyEng_m = NREarlyEng_m - G(\hat{\tau}_m - \tau_l - \Delta t)^2 \cdot NROnEng_l$ according to Equation 20. In step 406, the early energy interference remover 300 increases l by 1. In step 408, the early energy interference remover 300 checks whether l is smaller than the total path number L and performs step 402 if l is smaller than L and finishes the early energy interference removing process if l is not smaller than L.

$NREarlyEng_m$ generated by the above process is used as the early energy in the tracking process according to an exemplary embodiment of the present invention.

Next, Operation of the late energy interference remover 302 according to an exemplary embodiment of the present invention is described below with reference to FIG. 5.

Figure 5:
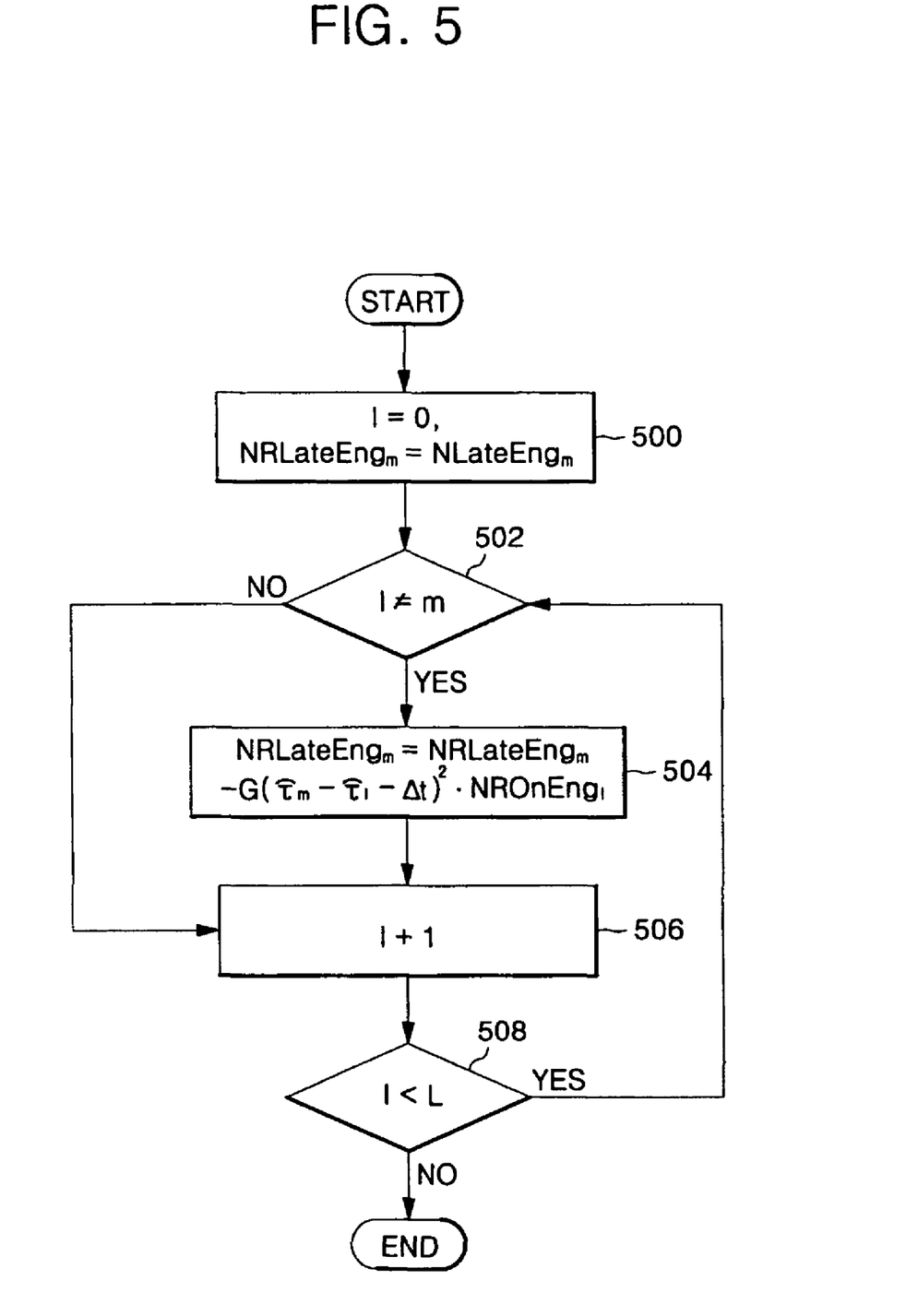
FIG. 5 is a flowchart illustrating an exemplary process for removing an interference component from a late energy signal according to an exemplary embodiment of the present invention.

FIG. 5 is a flowchart illustrating an exemplary process for removing an interference component from the late energy signal according to an exemplary embodiment of the present invention.

In FIG. 5, l represents a variable, m represents a number of a current path, and L represents a total path number.

In step 500, the late energy interference remover 302 is initialized to l=0 and $NRLateEng_m = NLateEng_m$. In step 502, the late energy interference remover 302 compares l and m. Here, the late energy interference remover 302 performs step 504 if l and m are different numbers, and perform step 506 if l and m are the same number.

In step 504, the late energy interference remover 302 calculates $NRLateEng_m = NRLateEng_m - G(\hat{\tau}_m - \tau_l + \Delta t)^2 \cdot NROnEng_l$ according to Equation 21. In step 506, the late energy interference remover 302 increases l by 1. In step 508, the late energy interference remover 302 checks whether l is smaller than the total path number L, performs step 502 if l is smaller than L, and finishes the late energy interference removing process if l is not smaller than L.

$NRLateEng_m$ which is generated by the above process and has no multipath interference component is used as the late energy in the tracking process according to an exemplary embodiment of the present invention.

A tracking method which can reduce the effects of multipath interference according to an exemplary embodiment of the present invention is described below with reference to FIG. 6.

Figure 6:
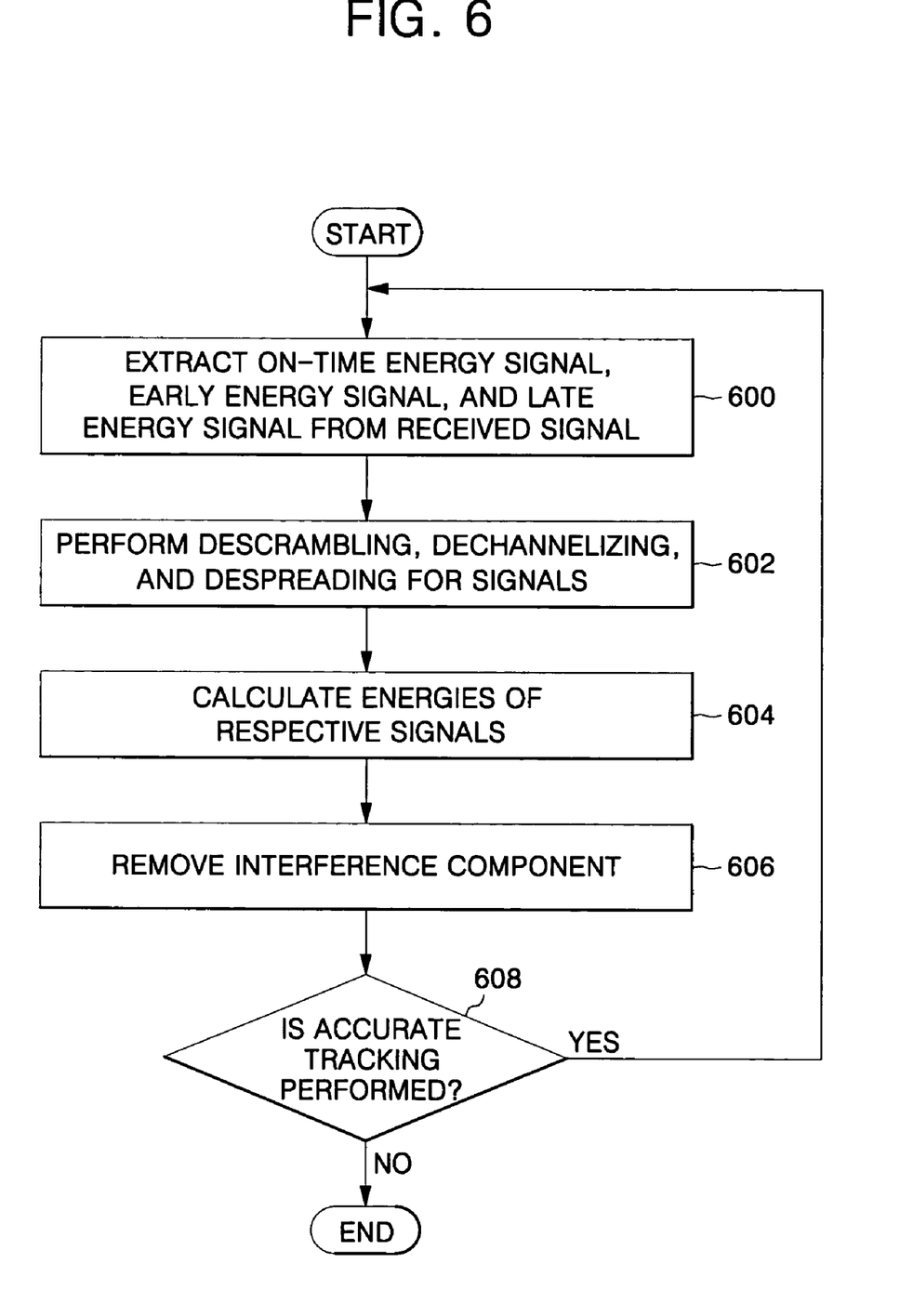
FIG. 6 is a flowchart illustrating an exemplary tracking process for reducing effects of multipath interference according to an exemplary embodiment of the present invention.

FIG. 6 is a flowchart illustrating an exemplary tracking process which can reduce the effects of multipath interference according to an exemplary embodiment of the present invention.

The tracking apparatus of the present invention extracts the on-time energy signal, the early energy signal, and the late energy signal from the received signal in step 600. The tracking apparatus descrambles, dechannelizes, and despreads the on-time energy signal, the early energy signal, and the late energy signal in step 602. The tracking apparatus calculates respective energies of the on-time energy signal, the early energy signal, and the late energy signal in step 604.

The tracking apparatus according to an exemplary embodiment of the present invention obtains the early and late energies from which interference is removed using Equations 20 and 21 in step 606. The tracking apparatus compares the amplitude of the interference-removed early energy to the amplitude of the interference-removed late energy to determine whether accurate tracking is performed in step 608. If it is determined that accurate tracking is not performed, step 600 is performed. That is, steps 600 to 608 are repetitively performed until accurate tracking is performed.

As described above, by using the interference-removed early energy and late energy for tracking, tracking is less affected by multipath interference.

As described above, the effects of multipath interference can be minimized in a mobile communication environment having multipath interference by using the efficient interference remover which removes the interference component from the early energy and the late energy used to perform the non-coherent tracking algorithm.

As described above, the tracking apparatus and method according to exemplary embodiments of the present invention can reduce a path merging phenomenon in a multipath fading channel in which paths are closely arranged, and can prevent performance degradation which may occur in the existing non-coherent tracking algorithm.

While the present invention has been described with reference to exemplary embodiments thereof, it will be understood by those skilled in the art that various changes in form and detail may be made therein without departing from the scope of the present invention as defined by the following claims.

What is claimed is:

1. A tracking apparatus of a mobile communication system, comprising:
   a signal extractor for extracting an on-time energy signal, an early energy signal, and a late energy signal from a received signal;
   an interference remover for removing a multipath interference component contained in the early energy signal and the late energy signal;
   a location estimator for comparing an amplitude of the interference-removed early energy and an amplitude of the interference-removed late energy output from the interference remover to determine whether an accurate receiving position is extracted;
   a feedback circuit for inputting a difference value between the early energy and the late energy output from the location estimator to the signal extractor so that the difference value is used to extract the on-time energy signal, the early energy signal and the late energy signal;
   a descrambler for descrambling the on-time energy signal, the early energy signal, and the late energy signal;
   a dechannelizer for dechannelizing the descrambled on-time energy signal, the early energy signal, and the late energy signal; and
   a despreader for despreading the dechannelized on-time energy signal, the early energy signal, and the late energy signal.

2. A tracking apparatus of a mobile communication system, comprising:
   a signal extractor for extracting an on-time energy signal, an early energy signal, and a late energy signal from a received signal;
   an early energy interference remover for removing a multipath interference component contained in a processed early energy signal;
   a late energy interference remover for removing a multipath interference component contained in a processed late energy signal;
   a location estimator for comparing an amplitude of the interference-removed early energy output from the early energy interference remover to an amplitude of the interference-removed late energy output from the late energy interference remover to determine whether an accurate receiving position is extracted; and
   a feedback circuit for inputting a difference value between the early energy and the late energy output from the location estimator to the signal extractor so that the difference value is used to extract the on-time energy signal, the early energy signal and the late energy signal;

wherein the processed early energy signal comprises a descrambled, dechannelized and despread early energy signal, and the processed late energy signal comprises a descrambled, dechannelized and despread late energy signal.

3. The apparatus of claim 2, wherein the location estimator converts one of the early energy and the late energy into a negative value and sums the negative value and the other value having a positive value to compare amplitudes of the early energy and the late energy.

4. The apparatus of claim 2, wherein the early energy interference remover calculates the interference-removed early energy using the following equation:

$$NREarlyEng_m = \sum_{i=0}^{N-1} REarlyEng_m(i)$$

$$= \sum_{i=0}^{N-1} \left\{ EarlyEng_m(i) - \sum_{l=0,l\neq m}^{L-1} ROnEng_l(i) \cdot G(\hat{\tau}_m - \hat{\tau}_l - \Delta t)^2 \right\}$$

$$= \sum_{i=0}^{N-1} EarlyEng_m(i) - \sum_{l=0,l\neq m}^{L-1} G(\hat{\tau}_m - \hat{\tau}_l - \Delta t)^2 \sum_{i=0}^{N-1} ROnEng_l(i)$$

$$= NEarlyEng_m - \sum_{l=0,l\neq m}^{L-1} G(\hat{\tau}_m - \hat{\tau}_l - \Delta t)^2 \cdot NROnEng_l$$

where $EarlyEng_m$ is the early energy, N is the number of symbols, R is the removed energy, i is the interference, $OnEng_l$ is the on time energy and $G(t)$ is the raised cosine filter, L is the total path number, l is a counter variable, m is the number of a current path, $\Delta t$ is a time offset for the early and late energy, $\hat{\tau}_l$ and $\hat{\tau}_m$ are location values.

5. The apparatus of claim 2, wherein the late energy interference remover calculates the interference-removed late energy using the following equation:

$$NRLateEng_m = \sum_{i=0}^{N-1} RLateEng_m(i)$$

$$= \sum_{i=0}^{N-1} \{LateEng_m(i) - \sum_{l=0,l\neq m}^{L-1} ROnEng_l(i) \cdot G(\hat{\tau}_m - \hat{\tau}_l + \Delta t)^2\}$$

$$= \sum_{i=0}^{N-1} LateEng_m(i) - \sum_{l=0,l\neq m}^{L-1} G(\hat{\tau}_m - \hat{\tau}_l + \Delta t)^2 \sum_{i=0}^{N-1} ROnEng_l(i)$$

$$= NLateEng_m - \sum_{l=0,l\neq m}^{L-1} G(\hat{\tau}_m - \hat{\tau}_l + \Delta t)^2 \cdot NROnEng_l$$

where $LateEng_m$ is the late energy, N is the number of symbols, R is the removed energy, i is the interference, $OnEng_l$ is the on time energy and $G(t)$ is the raised cosine filter, L is the total path number, l is a counter variable, m is the number of a current path, $\Delta t$ is a time offset for the early and late energy, $\hat{\tau}_l$ and $\hat{\tau}_m$ are location values.

6. A tracking method of a mobile communication system, comprising the steps of:

extracting an on-time energy signal, an early energy signal, and a late energy signal from a received signal;

processing the on-time energy signal, the early energy signal and the late energy signal;

calculating an interference-removed early energy using the processed on-time energy signal and the processed early energy signal, and calculating an interference-removed late energy using the processed on-time energy signal and the processed late energy signal: and comparing an amplitude of the interference-removed early energy and the amplitude of the interference-removed late energy to determine whether an accurate receiving position is extracted or not, wherein a difference value between the early energy and the late energy, which is a comparison result value, is fed back so that the difference value is used to extract the on-time energy signal, the early energy signal, and the late energy signal;

wherein the processing further comprises the steps of:

descrambling the on-time energy signal, the early energy signal, and the late energy signal;

dechannelizing the descrambled on-time energy signal, the early energy signal and the late energy signal; and despreading the dechannelized on-time energy signal, the early energy signal, and the late energy signal.

7. The method of claim 6, wherein the interference-removed early energy is calculated by the following equation:

$$NREarlyEng_m = \sum_{i=0}^{N-1} REarlyEng_m(i)$$

$$= \sum_{i=0}^{N-1} \left\{ EarlyEng_m(i) - \sum_{l=0,l\neq m}^{L-1} ROnEng_l(i) \cdot G(\hat{\tau}_m - \hat{\tau}_l - \Delta t)^2 \right\}$$

$$= \sum_{i=0}^{N-1} EarlyEng_m(i) - \sum_{l=0,l\neq m}^{L-1} G(\hat{\tau}_m - \hat{\tau}_l - \Delta t)^2 \sum_{i=0}^{N-1} ROnEng_l(i)$$

$$= NEarlyEng_m - \sum_{l=0,l\neq m}^{L-1} G(\hat{\tau}_m - \hat{\tau}_l - \Delta t)^2 \cdot NROnEng_l$$

where $EarlyEng_m$ is the early energy, N is the number of symbols, R is the removed energy, i is the interference, $OnEng_l$ is the on time energy and $G(t)$ is the raised cosine filter, L is the total path number, l is a counter variable, m is the number of a current path, $\Delta t$ is a time offset for the early and late energy, $\hat{\tau}_l$ and $\hat{\tau}_m$ are location values.

8. The method of claim 6, wherein the interference-removed late energy is calculated by the following equation:

$$NRLateEng_m = \sum_{i=0}^{N-1} RLateEng_m(i)$$

$$= \sum_{i=0}^{N-1} \{LateEng_m(i) - \sum_{l=0, l \neq m}^{L-1} ROnEng_l(i) \cdot G(\hat{\tau}_m - \hat{\tau}_l + \Delta t)^2$$

$$= \sum_{i=0}^{N-1} LateEng_m(i) - \sum_{l=0, l \neq m}^{L-1} G(\hat{\tau}_m - \hat{\tau}_l + \Delta t)^2 \sum_{i=0}^{N-1} ROnEng_l(i)$$

$$= NLateEng_m - \sum_{l=0, l \neq m}^{L-1} G(\hat{\tau}_m - \hat{\tau}_l + \Delta t)^2 \cdot NROnEng_l$$

where $LateEng_m$ is the late energy, N is the number of symbols, R is the removed energy, i is the interference, $OnEng_l$ is the on time energy and G(t) is the raised cosine filter, L is the total path number, l is a counter variable, m is the number of a current path, $\Delta t$ is a time offset for the early and late energy, $\hat{\tau}_l$ and $\hat{\tau}_m$ are location values.

* * * * *